United States Patent
Giro Amigo

(10) Patent No.: US 10,168,201 B2
(45) Date of Patent: Jan. 1, 2019

(54) DYNAMIC WEIGHING MACHINE WITH SLIDING RAIL WEIGHING CONVEYANCE

(71) Applicant: Girnet Internacional, S.L., Badalona (ES)

(72) Inventor: Ezequiel Giro Amigo, Badalona (ES)

(73) Assignee: Girnet Internacional, S.L., Badalona (ES)

( * ) Notice: Subject to any disclaimer, the term of this patent is extended or adjusted under 35 U.S.C. 154(b) by 156 days.

(21) Appl. No.: 15/341,087

(22) Filed: Nov. 2, 2016

(65) Prior Publication Data

US 2017/0122790 A1  May 4, 2017

(30) Foreign Application Priority Data

Nov. 2, 2015 (ES) .................................. 201531569

(51) Int. Cl.
*G01G 15/04* (2006.01)
*G01G 21/24* (2006.01)
*G01G 19/393* (2006.01)

(52) U.S. Cl.
CPC ........... *G01G 15/04* (2013.01); *G01G 19/393* (2013.01); *G01G 21/24* (2013.01)

(58) Field of Classification Search
CPC ....... G01G 15/04; G01G 19/393; G01G 21/24
USPC .......................................................... 177/1
See application file for complete search history.

(56) References Cited

U.S. PATENT DOCUMENTS

| 4,426,006 A * | 1/1984 | Horii ......................... B07C 5/18 |
| | | 177/145 |
| 5,813,195 A | 9/1998 | Nielsen et al. |
| 6,448,511 B1 * | 9/2002 | Dauder Guardiola ...................... |
| | | G01G 19/393 |
| | | 177/103 |

FOREIGN PATENT DOCUMENTS

| EP | 0 939 307 A1 | 9/1999 |
| EP | 2 221 590 A2 | 8/2010 |

OTHER PUBLICATIONS

Communication dated Feb. 8, 2017 from the European Patent Office in counterpart Application No. 16 38 2500.

* cited by examiner

*Primary Examiner* — Natalie Huls
*Assistant Examiner* — Monica S Young
(74) *Attorney, Agent, or Firm* — Sughrue Mion, PLLC

(57) ABSTRACT

A dynamic weighing machine that comprises a set of buckets, a series of bucket-carrying supports and a transport system that moves the supports along at least one horizontal straight path, the buckets being able to adopt a weighing position (B) on their support in which the bucket is slightly raised with respect to the support, and the buckets comprising first and second sliding means, each one arranged on one side of the bucket and the machine has a weighing station with a scale with first and second rail means between which buckets in transit can pass through the weighing station when they adopt their weighing coupling position (B), sliding while being supported by their first and second sliding means, like a bogie.

18 Claims, 4 Drawing Sheets

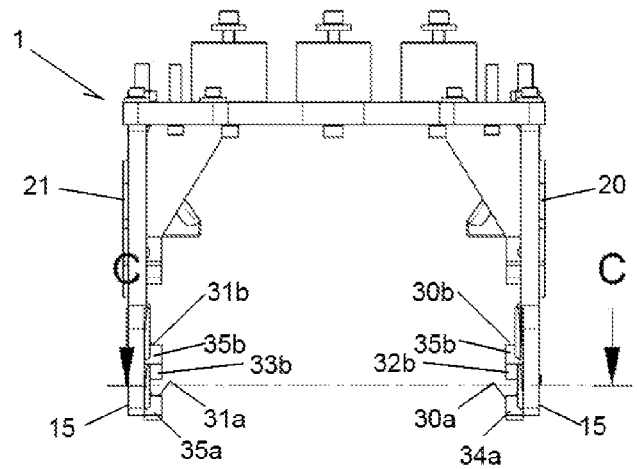
Fig. 3
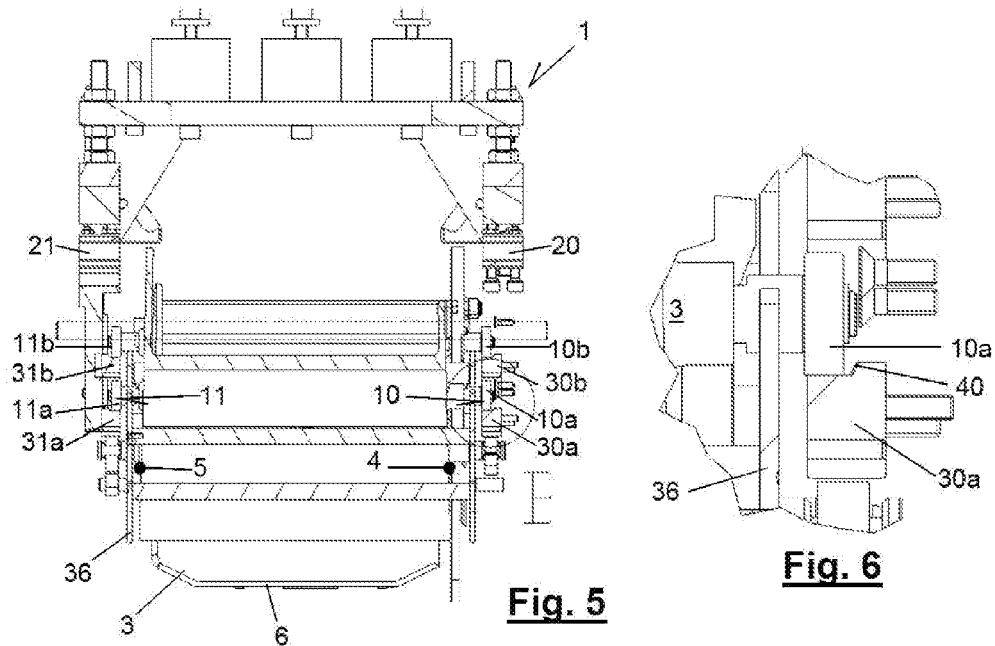
Fig. 5
Fig. 6

DYNAMIC WEIGHING MACHINE WITH SLIDING RAIL WEIGHING CONVEYANCE

TECHNICAL FIELD OF THE INVENTION

The invention relates to a dynamic weighing machine and a method for weighing buckets transported in continuous movement.

BACKGROUND OF THE INVENTION

Currently there are weighing machines with a transport system that continually moves carriages, to which buckets are coupled, along a closed path. A known type of machine comprises a series of work stations distributed along the path followed by the carriages, and by extension the buckets coupled to the carriages, such as a loading station where fruit is fed into the buckets; a weighing station where the fruit contained in each bucket is weighed; and an emptying or unloading station where the buckets are emptied.

In so-called combination weighing machines, several buckets are attached to the same support, and at the emptying station there is a selective emptying of the buckets whose total fruit weight is closest to a predetermined value. A weighing machine of this type is described in patent document EP 0982570.

The weighing operation in the weighing station is carried out without interrupting the forward movement of the carriages; in other words, without stopping the transport of the buckets.

To carry this out, in EP 0982570 it is suggested that the buckets are coupled to the carriages in a way that allows the buckets to be raised with respect to the associated carriage, but without becoming mechanically separated. This means that the bucket can adopt, with respect to the carriage, a supporting position in which the weight of the bucket rests upon the carriage, and a weighing position, in which the bucket is slightly raised with respect to the carriage.

This coupling allows the buckets in the weighing station to circulate by sliding along the weighing platform that is connected to a loading cell without ceasing to be transported by the associated carriage. On the machine according to EP 0982570, the buckets have flaps and a front extension that allow the bucket to support itself on the weighing platform in slide mode.

A similar solution is described in patent document EP 0803716, in which the buckets are assembled over a roller which is intended to support them on a weighing platform of the weighing station as the bucket is transported along the weighing station.

An aim of the invention is a more precise machine, which ensures better weighing accuracy than that of known machines.

Another aim of the present invention is to improve weighing accuracy without affecting the speed of the machine. This would prevent the transport speed of the buckets from slowing down and the weighing operation would not be the bottleneck of a machine that is incorporated, in addition to the weighing station and the loading and unloading stations of the upstream and downstream products, respectively, at the weighing station.

Other aims of the invention are to improve or simplify the maintenance tasks of the known machines. For example, during machine operation, dirt, particles or grease can fall onto the weighing platform and alter the accuracy of weight measurement. Furthermore, access to the weighing platform and other essential components of the platform, such as the loading cell, are arranged on the inner side of the carriage path when the weighing station is located on the straight top section of the closed path that make the carriages move.

DESCRIPTION OF THE INVENTION

The machine according to the invention is a dynamic weighing machine that comprises a set of buckets, each bucket having two sides and a bottom; a series of bucket-carrying supports; and a transport system that continually moves the supports along the path that comprises at least one horizontal straight path; the supports and buckets of the machine are prepared for their mutual coupling with limited vertical movement capacity of the bucket with respect to the support. Because of this, each bucket can adopt at least two coupling positions, one of which is a supporting position (A), in which the weight of the container rests on the support, and the other being a weighing position (B), in which the bucket is slightly raised with respect to the support, where both coupling positions allow the support to carry the bucket with it while being transported by the transport system. The transport system comprises the weighing machine; a weighing station for the buckets arranged on said horizontal straight path; a loading station for loading products in the buckets, arranged upstream from the weighing station; and a selective unloading station for products loaded in the buckets, arranged downstream from the weighing station.

The machine is characterized in that the buckets comprise first and second sliding means, each one arranged on one side of the bucket, and in that the weighing station comprises a scale with first rail means and second rail means, between which the buckets in transit can pass through the weighing station when they adopt their weighing coupling position (B), sliding while being supported by their first and second sliding means, like a bogie, on said first and second rail means of the scale, respectively.

According to the invention, the scale is not a type of platform, but rather an assembly of first and second rail means separated from each other, such that the buckets in transit, which are supported in slide mode as if they were bogies, can pass between these first and second rail means. In other words, the buckets are supported on their sides instead of on their bottom, which makes the useful load both under and above the support points of the bucket on the scale available, favoring the distribution of weight around these support points and thus helping reduce inertia and forces with vertical components that alter weight measurement.

With the aim to improve weight accuracy, in one embodiment, this particular arrangement allows the scale to comprise first and second loading cells, such that the first loading cell is connected to the first rail means and the second loading cell to the second rail means of the scale, such that each bucket is momentarily supported on each side by the rail means connected to different loading cells.

The total weight measured by the loading cells will determine the weight measurement of each bucket with its product load. As is usually the case, by knowing the weight of the bucket it is then possible to determine the weight of the load transported by the bucket.

In a variant of interest, the scale is suspended from a fixed cross-member, elevated above the transit of buckets. Advantageously, the assembly of the scale on the machine is made easier and interference with the transport system or its transmissions is avoided.

To improve transport stability and therefore improve the stability time of the scale during weighing operations, in a variant of the invention each one of the first and second sliding means comprise a front support element and a rear support element that are vertically offset; and each of the first and second rail means comprise two lanes or tracks that are vertically offset, corresponding to the offset between the support elements, such that as each bucket in slide mode passes through the weighing station, four points of the bucket will come into contact with the rail means at least once.

Preferably, the front and rear support elements on the same side of the bucket are on the same vertical plane.

According to a variant of interest, the lanes or tracks on the scale that intended to support the front support means of the buckets are pushed back in the advance direction of the buckets with respect to the lanes or tracks intended to support the rear support means. As explained later, this makes it possible to reduce the dimensions of the scale.

The invention takes into consideration the first and second sliding means being in the shape of wheels or runners.

In one variant, the weighing station comprises transfer means arranged in the advance direction of the buckets before and after the rail means of the scale which, due to contact with the buckets in transit or with the first and second sliding means of the buckets, first raise the buckets of the associated support from their support position (A) to their weighing position (B) and transfer them to the first and second rail means at the entrance of the weighing station; and afterwards, they return the buckets to their support position (A) at the exit of the weighing station.

According to an embodiment of the version in which the first and second rail means comprise lanes or tracks, the transfer means comprise, in the advance direction of the buckets, the same number of ascending ramps as lanes or tracks of the first and second rail means, each ramp leading to a corresponding lane or track at the entrance of the weighing station, as well as the same number of descending ramps as lanes or tracks of the rail means, each of which lead from a corresponding lane or track at the exit of the weighing station.

With the aim of mitigating the effects of the transfer to or from the scale, and thus improving the stability time of the scale, in one variant the connection gap between the ascending and descending ramps and their corresponding lanes or tracks is diagonal with respect to the direction that said lanes or tracks follow, such that the transfer between the ascending and descending ramps and their corresponding tracks is progressive.

It is of interest that the first and second sliding means are located on the sides of the buckets at a height such that there is useful housing space for the products to be transported under the level of said first and second sliding means. Taking the useful loading volume of the buckets as a reference, the first and second sliding means are preferably located on the sides of the buckets approximately at the average height of said useful loading volume.

In a variant of the machine, each support is prepared to receive the coupling of a row of individual buckets, the row being extended transverse to the direction in which the supports are transported, and in that the weighing station comprises as many scales as buckets in each row of buckets.

To couple each bucket to a support in a variant of the invention, an adapter is used which is firmly attached to or formed on the support, and which establishes a stable support frame for the bucket at its first and second sliding means, and two connection bars are used which are joined in an articulated manner at one first end to one side of the adapter and its at one other end to the side wall of the bucket.

BRIEF DESCRIPTION OF THE DRAWINGS

FIG. 3 is a front view of the scale of FIG. 2;

FIG. 5 is a view according to the cutting plane AA, in this case the complete scale, shown in FIG. 3;

FIG. 6 is an expanded view of zone B of FIG. 4;

DETAILED DESCRIPTION OF AN EMBODIMENT

Figure 1:
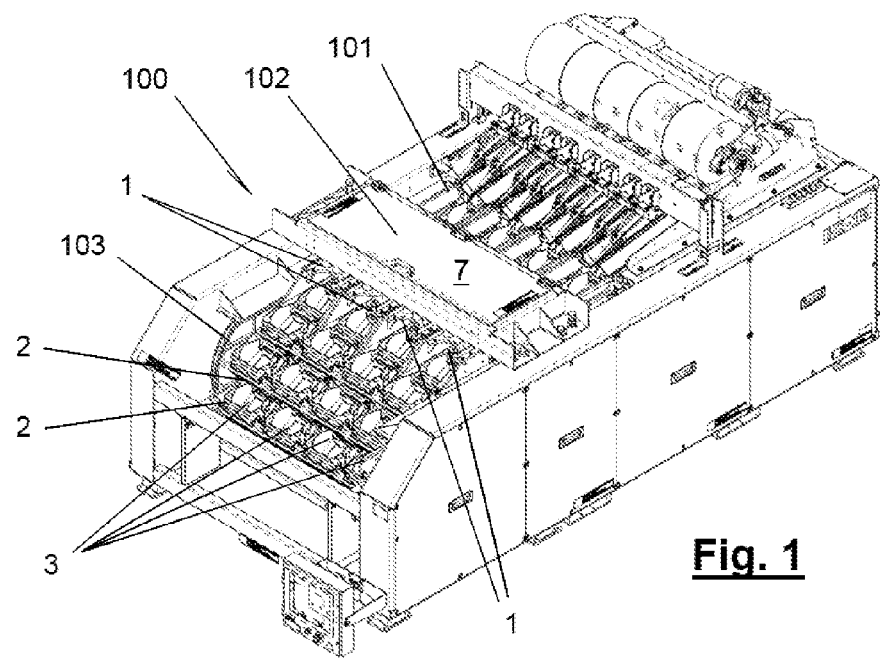
FIG. 1 is a general view of a dynamic weighing machine that simultaneously transports rows of buckets along several work stations, one of them being the weighing station of the bucket with as many scales as buckets in the row.

FIG. 1 shows a combination dynamic weighing machine 100 with a transport system 103 that comprises a double transporter or conveyor chain that ensures the transport of bucket-carrying supports 2 that support each one for a series of buckets 3 arranged on the row. The supports 2 are transported on the machine 100 of the example along a closed path such that each one moves a row of buckets 3 through a loading station 101 for loading products to be weighed; a weighing station 102 where the products contained in the buckets 3 are weighed; and an unloading station (not shown due to its location on the lower part of the machine) where the content of the buckets 3 is selectively unloaded, the total product weight of which is closer to a predetermined value.

In the machine 100, there are four buckets 3 in a row of buckets and correspondingly, the weighing station 102 comprises four scales 1, each of which are intended to measure the weight of the buckets 3 that pass, one after another, through the scale 1 without interrupting their forward movement.

Figure 2:
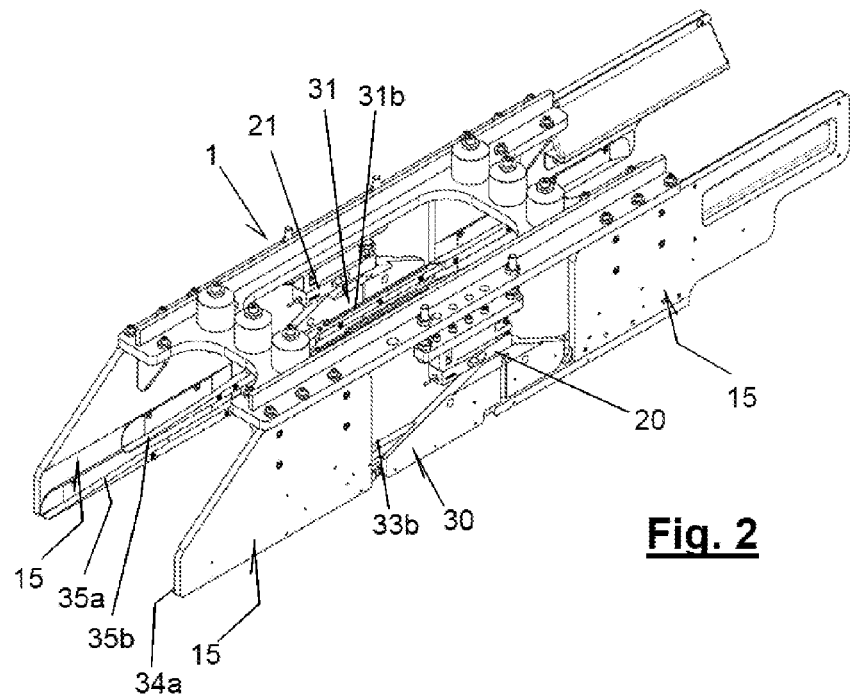
FIG. 2 is a perspective view of a scale of the weighing station of the machine of FIG. 1.

FIGS. 2 and 3 show in detail one of the scales 1 of the weighing station 102 of the machine 100. The scale 1 is an electronic scale that is not a part of the platform, but rather comprises separated first rail means 20 and second rail means 31, each one associated with a different loading cell 20, 21, between which the buckets 3 in transit can pass to the weighing station, sliding, like a bogie and along its sides, while being supported on said first and second rail means 30, 31. With this purpose, the buckets 3 are provided with first and second sliding means on their sides 4, 5, the details of which are described later.

Figure 4:
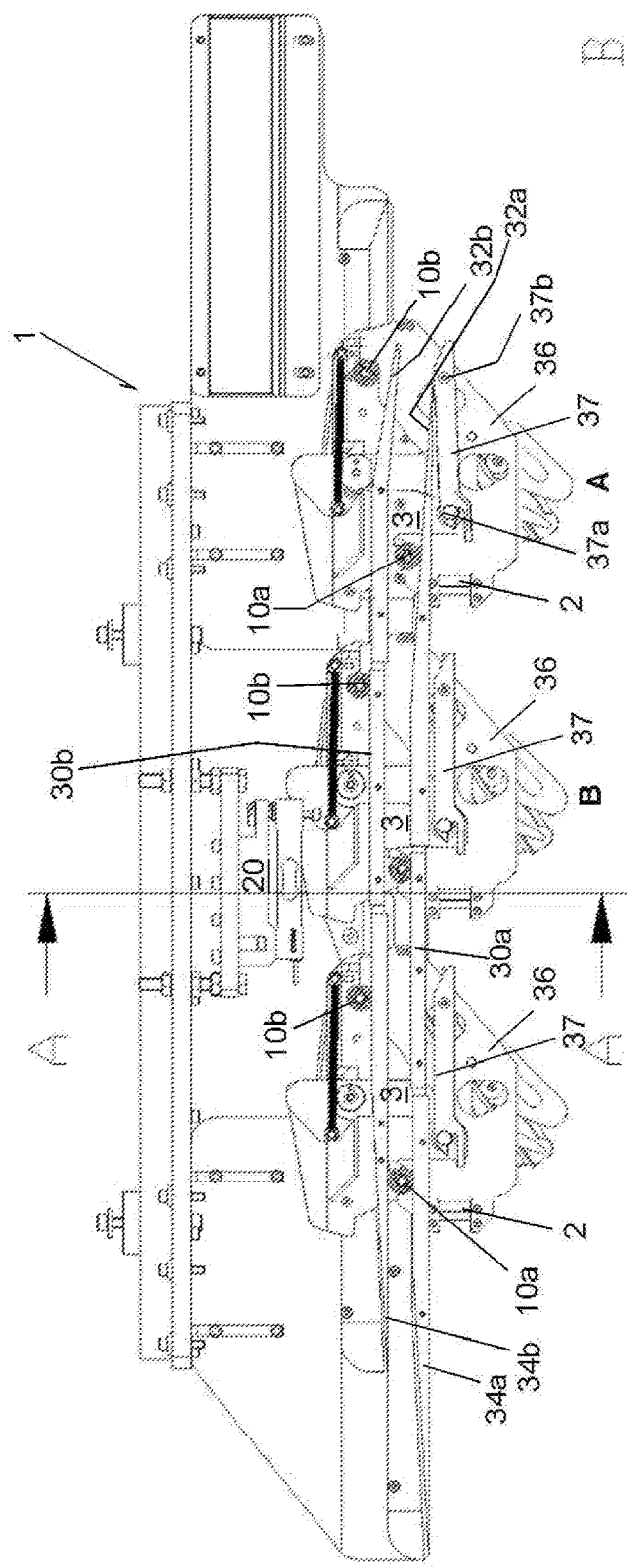
FIG. 4 shows the scale of FIG. 2, having removed from the drawing some components in order to show the transit of the supports, with their associated buckets, as they pass through the scale.

On the scale 1, the assembly formed by each loading cell 20 and 21 and the associated first and second rail means 30, 31 are suspended from a cross-member 7 that is fixed with respect to the chassis of the machine 100 (see FIG. 1) and elevated above the transit of the buckets 3, such that the scale 1 does not have a bottom surface upon which there may be elements that alter weight measurement, for example, dirt, particles or other elements that break away from the transported products, such as leaves, primary branches, stems, etc., when the products are fruit and vegetable products, such as oranges, tangerines, apples, etc. FIGS. 3, 4 and 5 show that there are two fixed loading cells 20, 21 from the anchoring or suspension system of the scale 1 to said cross-member 7, and under them are the respective guiding means 30 and 31, which are also suspended.

In order to weight the buckets 3, the buckets should be able to support themselves in slide mode on the first and second rail means 30, 31, resting their weight on those rail means 30, 31; and then, the buckets 3 are raised from their support 2 for a few moments.

FIG. 4 shows the scale of FIG. 2, having removed from the drawing some components in order to show the transit of the supports 2 with some adapters 36, to which we will refer later on in greater detail. These adapters carry the associated buckets 3 as they pass through the scale 1.

In the machine 100 of the example, the buckets 3 are separate and coupled to the supports 2, such that each bucket 3 can adopt at least two coupling positions in their adapter 36, one of which is a supporting position (A), where the weight of the bucket 3 rests on the support, and the other being a weighing position (B), where the bucket 3 is slightly raised with respect to the adapter 36, where both coupling positions allow the supporting assembly 2 and adapter 36 to carry the bucket while the support is transported in the machine 100.

For the coupling of each bucket 3 to a support 2, the adapters 36, which are firmly attached to the support 2, are used in the example. Each adapter 36 defines a stable support frame for the bucket 3, provided with two connection bars 37 joined in an articulated manner with the first end 37b attached to the adapter 36 and its other end 37a attached to a side 4, 5 of the bucket 3.

The connection bars 37 are rigid and allow the forward movement of the support 2, and therefore, of the adapter 36. The movement is transmitted to the bucket 3, regardless of whether the bucket adopts its support position (A) or its weighing position (B). Consider the fact that the end 37a of the connection bars 37 attached to the bucket 3 is, nevertheless, in the shape of a fork, which allows the bar to exert a pushing force on the bucket 3 when the support is transported in the advance direction of the machine 100. However, it can also decouple and remove the bucket 3 from its support 2 if the bars 37 are in the proper position, so that the buckets 3 of the supports 2 can be separated or replaced during maintenance tasks.

In the machine 100 of the example, the buckets 3 comprise first sliding means 10 on one side 4 and second sliding means 11 on the other side 5, which are intended to work with the rail means 30 and 31 to support the buckets 3 in slide mode as they pass through the scale. These first and second sliding means 10, 11 are also used in the machine of the example so that the bucket 3 supports its adapter 36 in a stable manner.

The first and second sliding means 10, 11 comprise a front support element 10a, 11a and a rear support element 10b, 11b that are on the same vertical plane, but at different heights. Each of the first and second rail means 30, 31 comprise two lanes or tracks 30a and 30b, 31a and 31b which are vertically offset, corresponding to the offset between the support elements, such that as each bucket 3 in slide mode passes through the scale 1, four points of the bucket will come into contact with the rail means, at least for an instant.

The lanes or tracks 30a, 31a on the scale 1 that intended to support the front support means 10a, 11a of the buckets 3 are pushed back in the advance direction of the buckets 3 with respect to the lanes or tracks 30b, 31b intended to support the rear support means 10b, 11b.

In order to place the buckets 3 in their weighing coupling position B as they pass through the scale 1, the weighing station 100 provides for, at the entrance and exit of each scale 1, some transfer means 15 that are placed in the advance direction of the buckets 3. Due to the contact of these transfer means with the support elements 10a, 11a and 10b, 11b of the buckets in transit, they first raise the buckets of the associated support 2 from their support position (A) to their weighing position (B), and then they transfer them from the first and second rail means 30, 31 at the entrance of the scale; and afterwards, return the buckets 3 to their support position (A) at the exit of the scale.

In the example, these transfer means 15 comprise, in the advance direction of the buckets 3, four ascending ramps 32a, 32b and 33a, 33b which lead to the lanes or tracks 30a, 30b and 31a, 31b at the entrance of the scale 1; and some descending ramps 34a, 34b, 35a, 35b that leave the same lanes or tracks 30a, 30b and 31a, 31b at the exit of the scale 1. In order for these ramps to work with the support elements 10a, 11a and 10b, 11b of the buckets 3, these elements laterally protrude from the adapter 36, as shown in FIG. 5.

FIG. 4 shows three adapter 36 and bucket 3 sets associated with three consecutive supports 2 of the machine 100.

In the set that is set the farthest back, the front support elements 10a, 11a (where the support elements 11b are not shown in FIG. 4) are about to slide along the ascending ramps 32a and 33a (where the ascending ramps 33a are not shown in FIG. 4), just before reaching the rear support elements 10b and 11b and the ascending ramps 32b and 33b are still supported on the adapter 36, such that the bucket 3 is about to be raised from its adapter 36 and cease to adopt the support position (A) in order to start moving towards its weighing position (B);

In the intermediate set, the four support elements 10a, 10b and 11a and 11b (where the support elements 11a and 11b are not shown in FIG. 4) already slide along the first section of the lanes or tracks 30a, 30b and 31a, 31b of the scale 1, as shown in FIG. 5. Along the path on scale 1, the bucket 3 adopts its weighing position (B), resting its weight upon the scale 1.

It is important to note that the lanes or tracks 30a, 31a on the scale 1 that are intended to support the front support means 10a, 11a of the buckets 3 are pushed back in the advance direction of the buckets 3 with respect to the lanes or tracks 30b, 31b intended to support the rear support means 10b, 11b. This compresses the scale 1 because the front and rear support elements 10a, 10b and 11a and 11b are simultaneously transferred to the rail means 30, 31 of the scale 1, while, due to the overlapping of the lanes or tracks during a first period of time at the entrance to the scale 1, only the front support means remain supported on the lower lanes or tracks, this first period of time not being valid to obtain weight measurement. In addition, at the exit of the scale during a second period of time, only the rear support means remain supported on the upper lanes or tracks, this second period of time not being valid to obtain weight measurement. A minimum period of time is necessary for the scale to be stabilized and to obtain a valid weight measurement. For this, the bucket 2 must be simultaneously supported by its front and rear support elements 10a, 11a and 10b and 11b on the scale 1, the option of overlapping the upper and lower lanes or tracks necessarily means having to increase its length, resulting in a scale 1 that is longer and a weighing station 102 that is not as compact.

In the forwardmost set, the four support elements 10a, 10b and 11a and 11b (where the support elements 11a and 11b are not shown in FIG. 4) slide along the descending ramps 34a, 34b and 35a, 35b (where the descending ramps 35a and 35b are not shown in FIG. 4) one moment after the scale 1 leaves this set, such that the bucket 2 is being returned to its adapter 36 halfway between its weighing position (B) and its support position (A).

In the example, the support elements 10a, 10b and 11a and 11b of the buckets 3 are rolling elements, in the shape of wheels, although they may also be simple runners or similar.

Figure 7:
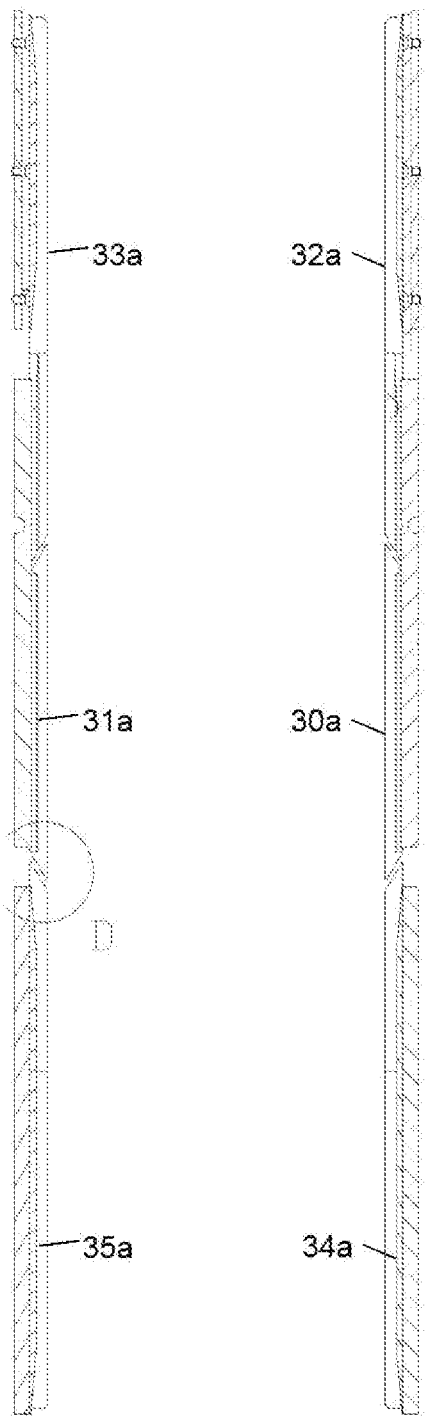
FIG. 7 is a view according to the cutting plane CC of FIG. 3.
Figure 8:
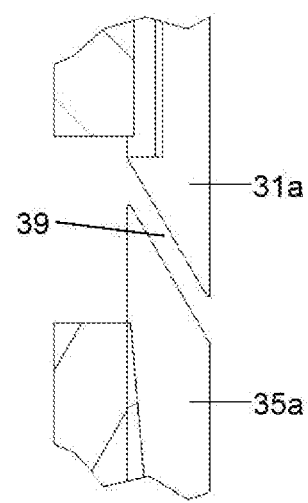
FIG. 8 is an expanded view of zone D of FIG. 7.

FIGS. 7 and 8 show a detail of interest on the scale 1 of the machine 100 of the example.

For the smooth transfer of the buckets 3 to the scale 1 or from the scale 1 to the ascending ramps 32a, 32b and 33a, 33b and to the descending ramps 34a, 34b and 35a, 35b, respectively, which contributes to quicker weight measurement, it is proposed that the connection gap 39 between these ascending and descending ramps and their corresponding lanes or tracks 30a, 30b and 31a, 31b are diagonal with respect to the direction that said lanes or tracks follow.

This characteristic is shown in detail in FIG. 8, which shows the existing gap 39 between the lane or track 31a and the descending ramp 35a. This particular configuration allows a more progressive transfer of the buckets 3 to or from the scale 1, avoiding bumps or jumps that can affect the time needed to stabilize the scale 1 in a weighing operation.

FIG. 6 shows another detail of interest that also contributes to obtaining a more precise weight measurement, in this case because it prevents unwanted friction forces between the sliding means 10 and 11 of the bucket 3 and the rail means 30, 31 of the scale 1 from altering weight measurement. Specifically, FIG. 6 shows that the tracks or lanes do not have stop corners on the outer side and in their place, they have a chamfer 40 pointed outwards and upwards, with which the sliding means 10 and 11 can be assembled on the rail means 30, 31, and specifically on this chamfer 40, in the case of there being excessive lateral deviation of the buckets 3 as they pass through the scale 1 instead of coming in contact with an end or a vertical wall that can stop its advance, and as a result, produce forces with vertical components that can alter weight measurement.

Precisely, to minimize the vertical components between the parts that intervene in the sliding movement of the buckets 3, the articulated joints 37a and 37b of the bars 37 are selected in such a way that they are horizontal in the moments during which the buckets 3 are on the scale 1, as shown in FIG. 4. In addition, the support elements 10a, 10b and 11 a, 11b of the containers 3 are located on the sides 4, 5 of said buckets 3 at a height that leaves useful housing space for the products to be transported below their level. In combination with the use of support rails 30, 31 that are placed next to both sides of the buckets 3 instead of using a weighing platform, the buckets can be supported as they pass through the scale 1, such that the transported products can be spread out above and below the level of the sliding means that intervene in the support of the buckets as they pass through the scale. This increases transport stability and minimizes the appearance of vertical components that alter or affect the accuracy of weight measurement, and it is a special situation if the location of the articulated joint 37a is also properly selected. A suitable arrangement of this articulated joint 37a is one that is close to the center of mass of the bucket 3.

The invention claimed is:

1. A dynamic weighing machine (100) that comprises a set of buckets (3), each bucket having two sides (4, 5) and a bottom (6); a series of bucket-carrying supports (2); and a transport system (103) that continually moves the supports along a path that comprises at least one horizontal straight path; the supports and buckets of the machine being prepared for their mutual coupling with limited vertical movement capacity of the bucket (3) with respect to the support (2), such that each bucket can adopt at least two coupling positions, one of which is a supporting position (A), in which the weight of the bucket rests on the support, and the other being a weighing position (B), in which the bucket is slightly raised with respect to the support, where both coupling positions allow the support to carry the bucket while being transported; the dynamic weighing machine further comprising a weighing station (102) for the buckets (3) arranged on said horizontal straight path; a loading station (101) for loading products in the buckets, arranged upstream from the weighing station; and a selective unloading station for products loaded in the buckets, arranged downstream from the weighing station; and wherein the buckets (3) comprise first and second sliding means (10, 11), each one arranged on one side (4, 5) of the bucket (3); and the weighing station (102) comprises a scale (1) with first rail means (30) and second rail means (31), between which the buckets (3) in transit can pass through the weighing station (102) when the buckets adopt the weighing position (B), sliding while being supported by the first and second sliding means (10, 11) on said first and second rail means (30, 31), respectively; and wherein each one of the first and second sliding means comprise a front support element and a rear support element that are offset vertically and each of the first and second rail means comprise two lanes or tracks which are offset vertically, corresponding to the offset between the support elements, such that as each bucket passes through the weighing station, four points of the bucket will come into contact with the rail means, at least for an instant.

2. A machine (100) according to claim 1, wherein the scale (1) comprises first and second loading cells (20, 21), such that the first loading cell (20) is connected to the first rail means (30) and the second loading cell (21) to the second rail means (31) of the scale (1), such that each bucket (3) is momentarily supported on each side by the rail means connected to different loading cells.

3. A machine (100) according to claim 1, wherein the scale (1) is suspended from a fixed cross-member (7), elevated above the transit of buckets (3).

4. A machine (100) according to claim 1, wherein the front and rear support elements (10a and 10b, 11a and 11b) on the same side of the bucket (3) are in the same vertical plane.

5. A machine (100) according to claim 1, wherein the lanes or tracks (30a, 31a) on the scale (1) that are configured to support the front support element (10a, 11a) of the buckets (3) are set back in an advance direction of the buckets (3) with respect to the lanes or tracks (30b, 31b) configured to support the rear support element (10b, 11b).

6. A machine (100) according to claim 1, wherein the first and second sliding means (10, 11) are in the shape of wheels or runners.

7. A machine (100) according to claim 1, wherein the weighing station (102) comprises transfer means (15) arranged in the advance direction of the buckets (3) before and after the first and second rail means (30, 31) of the scale (1) which, due to contact with the buckets (3) in transit or with the first and second sliding means (10, 11) of the buckets (3), first raise the buckets of the associated support (2) from their support position (A) to their weighing position (B) and transfer them to the first and second rail means (30, 31) at the entrance of the weighing station (102); and afterwards, return the buckets (3) to the support position (A) at an exit of the weighing station (102).

8. A machine (100) according to claim 7, wherein the first and second rail means (30, 31) comprise lanes or tracks, wherein the transfer means (15) comprise, in the advance direction of the buckets (3), the same number of ascending ramps (32*a*, 32*b*, 33*a*, 33*b*) as lanes or tracks of the first and second rail means, each ramp leading to a corresponding lane or track at the entrance of the weighing station (102), as well as the same number of descending ramps (34*a*, 34*b*, 35*a*, 35*b*) as lanes or tracks of the rail means, each of which lead from a corresponding lane or track at the exit of the weighing station (102).

9. A machine (100) according to claim 8, wherein the connection gap (39) between the ascending and descending ramps (32*a*, 32*b*, 33*a*, 33*b*, 34*a*, 34*b*, 35*a*, 35*b*) and their corresponding lanes or tracks (30*a*, 30*b*, 31*a*, 31*b*) is diagonal with respect to the direction that said lanes or tracks follow, such that the transfer between the ascending and descending ramps and their corresponding tracks is progressive.

10. A machine (100) according to claim 1, wherein the first and second sliding means (10, 11) are located on the sides (4, 5) of the buckets at a height level that provides housing space for the products to be transported under the height level of said first and second sliding means.

11. A machine (100) according to claim 10, wherein using the housing space of the buckets (3) as a reference, the first and second sliding means (10, 11) are located on the sides (4, 5) of the buckets approximately at the average height of said housing space.

12. A machine (100) according to claim 1, wherein each support (2) is prepared to receive the coupling of a row of individual buckets (3), the row extending transverse to the direction in which the supports are transported, and the weighing station (102) comprises as many scales (1) as buckets in each row of buckets.

13. A machine (100) according to claim 1, wherein to couple each bucket (3) to its support (2), an adapter (36) is used which is firmly attached to or formed on the support (2), and which establishes a stable support frame for the bucket (3) at its first and second sliding means (10, 11), and two connection bars (37) which are joined in an articulated manner at a first end (37*b*) to one side of the adapter (36) and at another end (37*a*) to the side wall of the bucket (3).

14. The machine according to claim 1, wherein the buckets with the first and second sliding means form a bogie.

15. A method for weighing buckets, which comprises the transportation of bucket-carrying supports (2) along at least one horizontal straight path, the buckets (3) being able to adopt a weighing position (B) on said supports (2) in which the bucket is slightly raised with respect to the support, the buckets (3) comprising first and second sliding means (10, 11), each one arranged on one side (4, 5) of the bucket, and wherein arranged on said horizontal straight path, there is a weighing station (102) with a scale with first and second rail means (30, 31), between which the transported buckets (3) are passed through, adopting their weighing position (B) with respect to the support (2) and sliding or rolling while being supported by their first and second sliding means (10, 11); and wherein each one of the first and second sliding means comprise a front support element and a rear support element that are offset vertically and each of the first and second rail means comprise two lanes or tracks that are offset vertically, corresponding to the offset between the support elements, such that as each bucket passes through the weighing station, four points of the bucket will come into contact with the rail means, at least for an instant.

16. A dynamic weighing machine, comprising:
buckets, each bucket having sides and a bottom;
supports that carry the buckets;
a transport system that continually moves the supports along a path that comprises a horizontal straight path;
a weighing station for the buckets arranged along the horizontal straight path;
a loading station for loading products in the buckets, arranged upstream from the weighing station; and
a selective unloading station for products loaded in the buckets, arranged downstream from the weighing station;
the supports and weighing station are configured so each bucket adopts at least two coupling positions, a first coupling position in which the bucket rests on the support, and a second coupling position that is a weighing position in which the bucket is raised with respect to the support relative to the first coupling position, wherein the first and second coupling positions allow the support to move with the bucket while being transported;
each bucket comprises a front roller or runner and a rear roller or runner;
the weighing station comprises a scale with a first rail and second rail, along which the buckets are conveyed through the weighing station when the buckets adopt the second coupling position, while the buckets are supported by the a front and rear rollers or runners on the first and second rails, respectively; and
wherein the front rollers or runners are vertically offset from the rear rollers or runners and the first rail is vertically offset from the second rail.

17. The machine according to claim 16, wherein for each bucket, the front rollers or runners and the rear rollers or runners provide four support points that support the bucket on the first and second rails.

18. The machine according to claim 16, wherein the scale comprises a first loading cell operatively coupled to the first rail and a second loading cell operatively coupled to the second rail and wherein the weight of the bucket is determined based on measurements at least from the first loading cell and the second loading cell.

* * * * *